United States Patent Office 2,864,834
Patented Dec. 16, 1958

2,864,834

PREGNATETRAENES AND METHOD OF PREPARING THE SAME

Harold Mendelsohn, Nanuet, and Leland L. Smith, New City, N. Y., and Victor E. Origoni, Emerson, N. J., assignors to American Cyanamid Company, New York, N. Y., a corporation of Maine No Drawing. Application October 8, 1957
Serial No. 688,831

7 Claims. (Cl. 260—397.45)

This invention relates to steroids of the pregnane series; more particularly it relates to 1,4,9(11),16-pregnatetraenes and esters thereof.

Recently, a number of steroids of the pregnene and pregnadiene series have been described as being highly active biologically without the usual undesirable side effects. United States Patent No. 2,789,118 describes and claims highly active compounds of the pregnadiene series which are useful as anti-inflammatory agents in the treatment of arthritis, asthma, burns, bursitis, and the like. We have now found that these pregnadienes can be prepared from pregnatetraenes in a few steps. The compounds of the present invention, therefore, are useful as intermediates in the preparation of highly active pregnadienes, as shown hereinafter.

The compounds of the present invention can be illustrated by the following general formula:

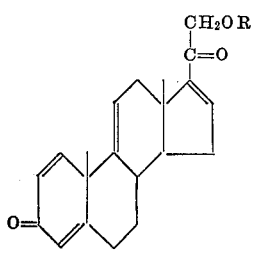

in which R is hydrogen or a lower alkanoyl radical.

The present compounds are crystalline solids having a definite melting point. They are soluble to some extent in organic solvents, such as petroleum ether, ethyl ether, alcohols, esters, ketones, and the like. They are comparatively insoluble in water.

The process of preparing the compounds of the present invention uses a 21-acyloxy-4,9(11),16-pregnatriene-3,20-dione, which is described in United States Patent No. 2,773,080. These compounds are prepared by treating the said pregnatriene with a mild oxidizing agent, such as selenium dioxide, at a temperature of about 40° C. to 120° C. The upper level of temperature depends somewhat on the particular lower alkyl alcohol solvent used, since the reaction is preferably run at refluxing temperatures. We have found that tertiary butanol in the presence of glacial acetic acid gives good results as a solvent. The 21 - acyloxy - 4,9(11),16 - pregnatriene - 3,20 - dione is heated with the oxidizing agent for a period of from three to thirty-six hours or until a stoichiometric reaction takes place.

When the reaction is substantially complete, the reaction mixture is evaporated to dryness, the residue is dissolved in a water immiscible solvent, such as benzene, and the benzene solution is washed with cold sodium hydroxide solution and water. The washed benzene solution is then evaporated to dryness, chromatographed on a partition column, and further purified by crystallization, as described hereinafter in the examples.

The compounds of the present invention can be used in the preparation of 1,4-pregnadienes, such as those described in United States Patent No. 2,789,118. The present process and the conversion of the present compound to those having high biological activity can be illustrated by the following flow sheet.

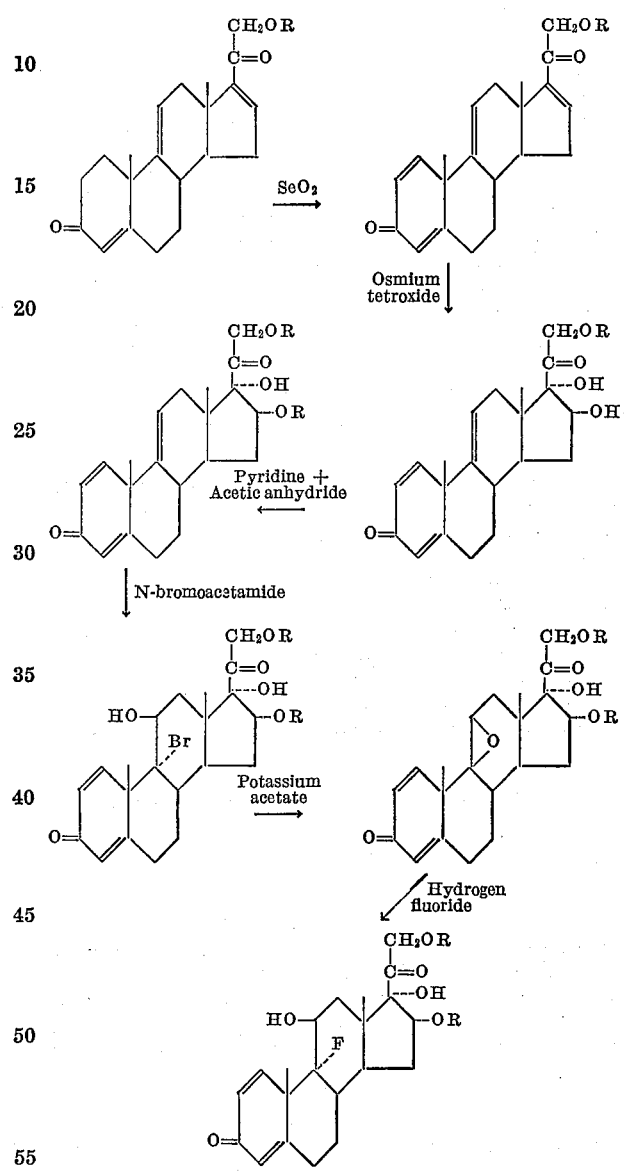

United States Patent No. 2,789,118

In the above flow sheet, R is as defined above.

The intermediates of the present invention are particularly valuable in that they permit the introduction to the 16,17-dihydroxy as well as the 11-oxygen function necessary to corticoid activity.

The following examples illustrate in detail the preparation of the compounds of the present invention.

Example 1

To 5 gm. of 21-acetoxy-4,9(11),16-pregnatriene-3,20-dione is added 300 ml. of tertiary butanol and 1.65 gm. of selenium dioxide. The mixture is refluxed at about 85° C. for 18.5 hours. At the end of that time, 1.0 gm. of selenium dioxide is added, and the refluxing is continued for a further period of six hours. The reaction mixture is concentrated under reduced pressure, and the resulting residue is dissolved in 200 ml. of benzene. The benzene solution is washed with 50 ml. of cold (5° C.) 1 N sodium hydroxide. The benzene solution is then washed with two separate 100 ml. portions of cold water. The benzene solution is then concentrated to dryness, and the residue is dissolved in 150 ml. of methanol. The methanol solution is heated with activated charcoal and concentrated to about 20 ml. The mixture is filtered, and the filter cake is washed with cold methanol. The filtrate is evaporated under reduced pressure to give a residue of 1.05 gm. A portion of this residue, when subjected to paper chromatography, indicates the presence of 21-acetoxy-1,4,9(11),16-pregnatetraene-3,20-dione.

150 mgm. of the compound prepared immediately above is dissolved in 20 ml. of 1:1 upper:lower phase mixture of the following solvent system:

|  | Ml. |
|---|---|
| Skellysolve C | 1,000 |
| Ethyl acetate | 600 |
| Methanol | 650 |
| Water | 500 |

To the column containing diatomaceous earth treated with bottom phase of the solvent system the 20 ml. solution of the product is added, and the column is developed with the upper phase of the solvent system. The fractions containing the desired product are collected. The procedure immediately above was carried out three separate times. The combined fractions from each of the runs is evaporated under reduced pressure. The residue obtained is dissolved in a minimum volume of a 1:1 mixture of acetone in methanol. To this mixture is added twice its volume of a 1:1 mixture of petroleum ether:ethyl ether. Crystals obtained are separated and dried under reduced pressure. An infrared absorption spectrum indicates that the compound is 21-acetoxy-1,4,9(11),16-pregnatetraene-3,20-dione. The specific rotation (in chloroform) is +115°. $E^{1 \text{ mole}}$ at 239 m$\mu$=24,000. The melting point is 166°–171° C.

The product from partition chromatography was recrystallized from benzene-methanol (1–10), from methanol, and finally from acetone. The product had a melting point of 172°–174° C. $[\alpha]_D^{25}$+118°; $E^{1 \text{ mole}}$ at 239 m$\mu$=24,500.

*Analysis.*—Theoretical: Carbon, 75.38; hydrogen, 7.15. Found: Carbon, 75.17; hydrogen, 7.15.

*Example 2*

The 21-acetoxy-1,4,9(11),16-pregnatetraene-3,20-dione prepared in Example 1 is dissolved in methanol and treated with sodium methoxide. After standing for an hour, it is neutralized with acetic acid. The 21-hydroxy-1,4,9(11),16-pregnatetraene-3,20-dione is recovered and purified by crystallization.

*Example 3*

To a solution of 215 mg. of 21-acetoxy-1,4,9(11),16-pregnatetraene-3,20-dione in 8 ml. of benzene containing 0.12 ml. of pyridine is added 160 mg. of osmium tetroxide in 4 ml. of benzene. The mixture is stirred for one hour, at which time 8 ml. of methanol is added, followed by 12 ml. of a solution containing 1.20 g. of sodium sulfite and 1.20 g. of potassium bicarbonate. The mixture is stirred for three hours, after which time 6 ml. of chloroform and 1 g. of kieselguhr are added. The mixture is stirred for thirty minutes and filtered. The filter cake is washed with chloroform, and the chloroform washes are used to extract the aqueous filtrate. The combined chloroform extracts are washed with saturated brine and dried over anhydrous sodium sulfate. The dried extracts are concentrated under reduced pressure to dryness, the residue is dissolved in 2 ml. of pyridine, and 0.55 ml. of acetic anhydride is added. After standing overnight, the solution is evaporated under reduced pressure with additions of toluene and methanol to remove excess anhydride. The final residue was crystallized from acetone. The product, 16α,21-diacetoxy-17α-hydroxy - 1,4,9(11) - pregnatriene - 3,20 - dione, melts at 191°–199° C. and is shown by infrared spectra to be identical with a sample previously characterized.

We claim:

1. Compounds having the general formula:

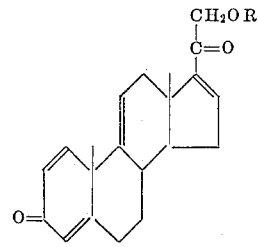

in which R is hydrogen or a lower alkanoyl radical.

2. A 21-lower alkanoyl 1,4,9(11),16-pregnatetraene-3,20-dione.

3. The compound 21-acetoxy-1,4,9(11),16-pregnatetraene-3,20-dione.

4. The compound 21-hydroxy-1,4,9(11),16-pregnatetraene-3,20-dione.

5. A method of preparing compounds having the formula:

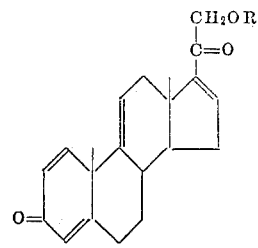

in which R is a member of the group consisting of hydrogen and lower alkanoyl radicals, which comprises heating to a temeprature within the range of 40°–120° C. a compound having the formula:

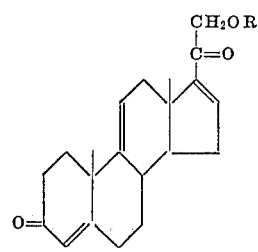

in which R is as defined, with selenium dioxide in the presence of a solvent for the reactants.

6. A method of preparing compounds having the formula:

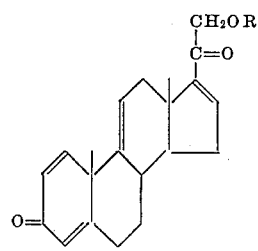

in which R is a member of the group consisting of hydrogen and lower alkanoyl radicals, which comprises heating to a temperature within the range of 40°–120° C. a compound having the formula:

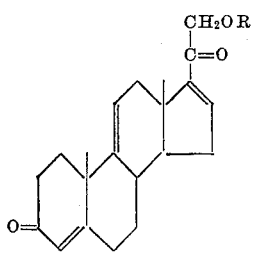

in which R is as defined, with selenium dioxide in the presence of a solvent for the reactants.

7. A method of preparing 21-acetoxy-1,4,9(11),16-pregnatetraene-3,20-dione which comprises heating to a temperature within the range of 40°–120° C. 21-acetoxy-4,9(11),16-pregnatriene-3,20-dione with selenium dioxide in the presence of a solvent for the reactants.

References Cited in the file of this patent

UNITED STATES PATENTS 2,773,080   Bernstein _____ Dec. 4, 1956

OTHER REFERENCES

Szpilfogel: Rec. Trav. Chim. des Pays Bas, 1956, 75, 475.